July 22, 1969      W. G. BERNHARDT      3,456,707

AIRCRAFT WHEEL AND TIRE ASSEMBLING MACHINE

Filed Jan. 13, 1967      3 Sheets-Sheet 1

INVENTOR.
WILLIAM G. BERNHARDT
BY *W. H. Losche*
*Paul S. Collignon*
     Attorneys July 22, 1969 W. G. BERNHARDT 3,456,707
AIRCRAFT WHEEL AND TIRE ASSEMBLING MACHINE
Filed Jan. 13, 1967 3 Sheets-Sheet 2

INVENTOR.
WILLIAM G. BERNHARDT
BY
Paul S. Collignon
Attorneys

July 22, 1969  W. G. BERNHARDT  3,456,707
AIRCRAFT WHEEL AND TIRE ASSEMBLING MACHINE
Filed Jan. 13, 1967  3 Sheets-Sheet 3

INVENTOR.
WILLIAM G. BERNHARDT
BY *W. H. Losche*
*Paul S. Collignon*
Attorneys

United States Patent Office 3,456,707
Patented July 22, 1969

3,456,707
AIRCRAFT WHEEL AND TIRE ASSEMBLING MACHINE
William G. Bernhardt, 1335 Isabelle, Memphis, Tenn. 38122
Filed Jan. 13, 1967, Ser. No. 609,723
Int. Cl. B60c 25/00; B25h 5/00; B60b 3/08
U.S. Cl. 157—1.1                                  3 Claims

ABSTRACT OF THE DISCLOSURE

A machine for assembling a tire between split halves of a wheel, said machine having a plurality of spring biased socket holders for engagement with wheel lug bolts, said socket holders being limited in rotation, and a compression mechanism for moving the split halves of a wheel together.

---

The invention described herein may be manufactured and used by or for the Government of the United States of America for governmental purposes without the payment of any royalties thereon or therefor.

The present invention relates to a wheel and tire assembling machine, and more particularly to a machine for assembling a tire to an aircraft wheel of the split type.

Many aircraft wheels, and particularly those on military airplanes, are of the split type which have first and second halves bolted together with the tire between the two halves. In order to remove or replace a tire, it is necessary to use one tool to prevent the bolt heads from turning and to use a second tool to loosen the lug nuts. The use of the two tools normally entails the use of two men to disassemble a wheel. What is more difficult, however, is the assembling of the wheel with the tire between the two wheel halves. In order that the tire be securely fastened or clamped between the two wheel halves, it is necessary to draw the two halves together a considerable distance, however, the natural resiliency of the tire tends to keep the two wheel halves apart. It is first necessary that the tire be squeezed or compressed so that nuts can engage the lug bolts. One heretofore used method of assembling a tire between the two wheel halves consisted of having one person stand on the wheel in order to compress the tire while another person started the nuts onto the lug bolts.

The present invention relates to an assembling machine that readily permits one person to rapidly mount a tire between two wheel halves. The machine engages the heads of the lug bolts to prevent them from turning and at the same time provides a compressive force to move the two wheel halves together so that the nuts can be threaded onto the lug bolts. In order to more readily align the sockets on the machine with the lug bolts and in order to facilitate the engagement of the sockets with the lug bolts, the sockets are spring mounted to permit vertical movement and also the sockets are rotatable a partial of a revolution. As wheels for different military airplanes are provided with different size lug bolts and nuts, the sockets are removably attached to the machine along with a removable guide plate, and different size sockets can be readily provided to accommodate different wheels.

It is therefore a general object of the present invention to provide a machine for assembling a tire between the split halves of a wheel for an airplane.

Another object of the present invention is to provide an assembling machine for aircraft wheels which can readily accommodate different size lug nuts.

Still another object of the present invention is to provide an assembling machine which will compress a tire to facilitate the mounting of the tire on an aircraft wheel.

Other objects and advantages of the present invention will be readily appreciated as the same becomes better understood by reference to the following detailed description when considered in connection with the accompanying drawings wherein.

Figure 1:
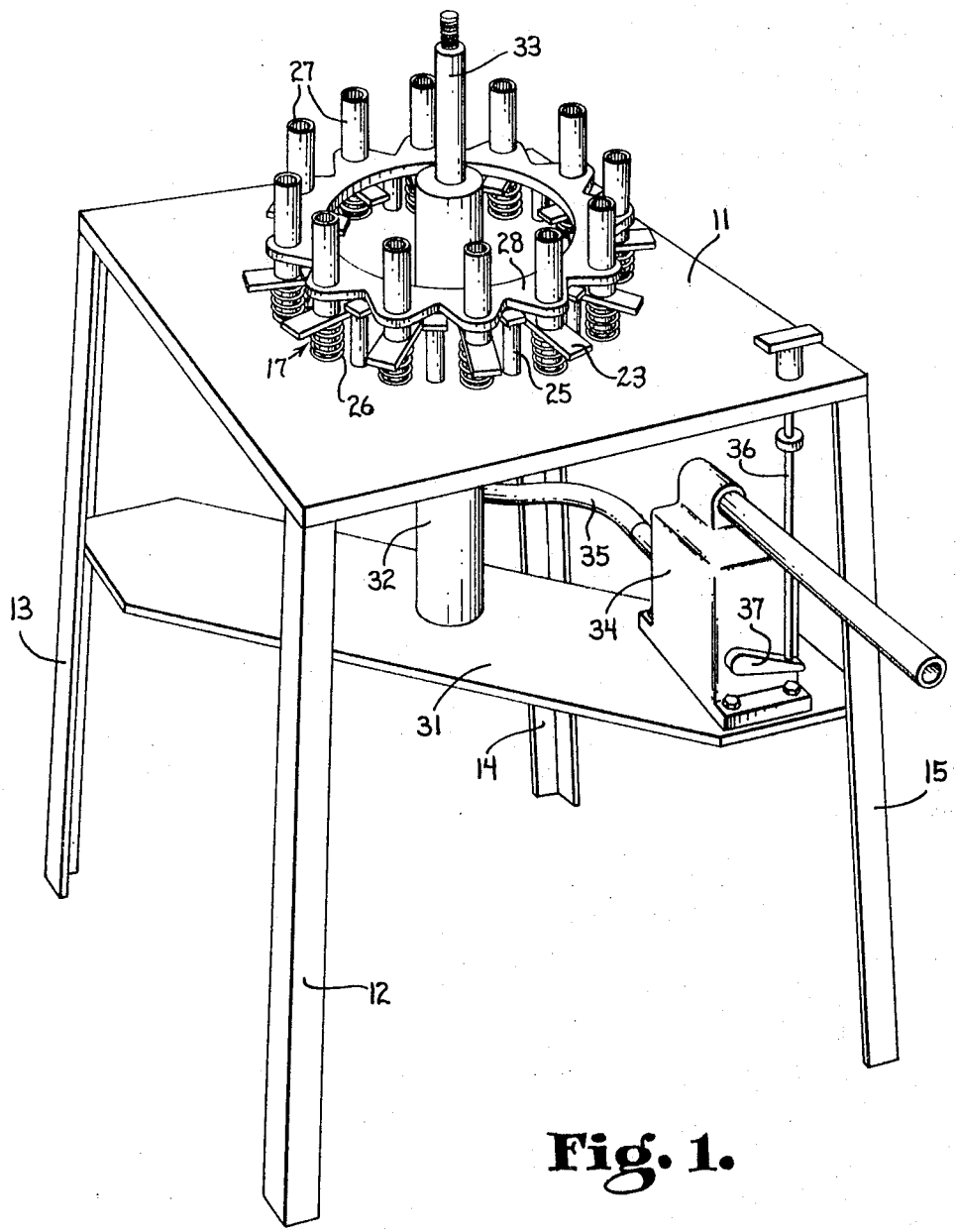
FIGURE 1 is a perspective view of a wheel and tire assembling machine embodying the present invention.

Referring now to the drawings, there is shown a base plate 11 that is supported on legs 12, 13, 14, and 15. A plurality of equally spaced holes 16 on a bolt circle are provided in base plate 11, and a socket holder 17 is inserted in each hole 16 and secured thereto by a nut 18. Each socket holder 17 has a cylindrical portion 19 and a threaded portion 21 on the bottom thereof. A square portion 22 is provided on the top of the cylindrical portion 19 and is adaptable for engaging a square hole in a socket. A stop arm 23 is provided adjacent the square portion 22 and extends on each side of the cylindrical portion 19. A plurality of tapped holes 24 are also provided in base plate 11. Holes 24 are on the same bolt circle as are holes 16 and are equally spaced between holes 16. A stop 25 is threaded into each hole 24. Socket holders 17, which are secured in holes 16, are mounted on springs 26 which are positioned around cylindrical portion 19 and between base plate 11 and stop arm 23. Springs 26 permit a short vertical movement of socket holders 17.

Figure 5:
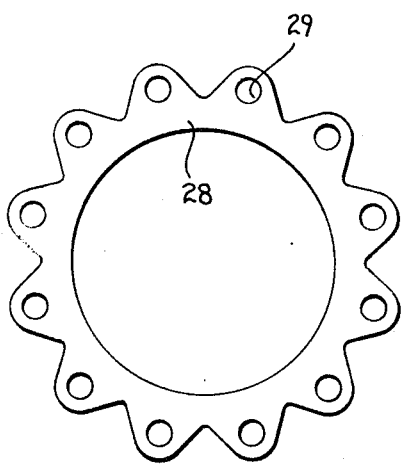
FIGURE 5 is a top view showing a guide plate having holes for accommodating standard sockets.
Figure 6:
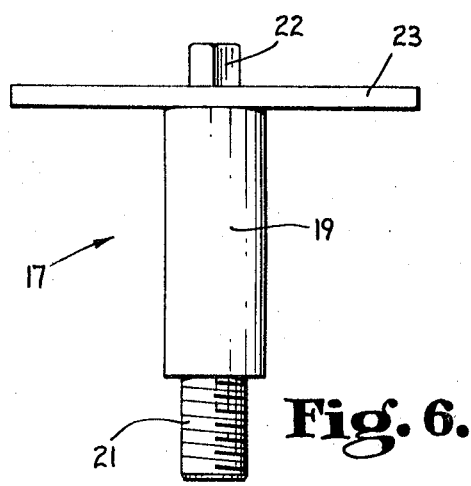
FIGURE 6 is a side view of a socket holder.

A plurality of sockets 27 are provided, and the wrench-end, which has a square hole therein, is slip-fitted onto the square portion 22 of socket holder 17. A guide plate 28, as shown specifically in FIGURE 5 of the drawings, is supported by the top end portions of stop arms 23, and is provided with a plurality of holes 29 that are slightly larger than the outside diameters of sockets 27 thereby permitting a slip-fit of the sockets 27 in holes 29. Guide plate 28 thus provides support for sockets 27 so that they are aligned parallel with one another. It is contemplated that standard size sockets 27 will be utilized to engage with the square portion 22 and that different size lug bolts may be utilized on different wheels. For example, one military airplane used lug bolts that took a three-quarter inch socket, while another airplane used lug bolts that took a nine-sixteenth inch socket. As the outside diameters of these standard size sockets are different, a separate guide plate 28 is provided for each different size socket that is to be utilized.

Figure 2:
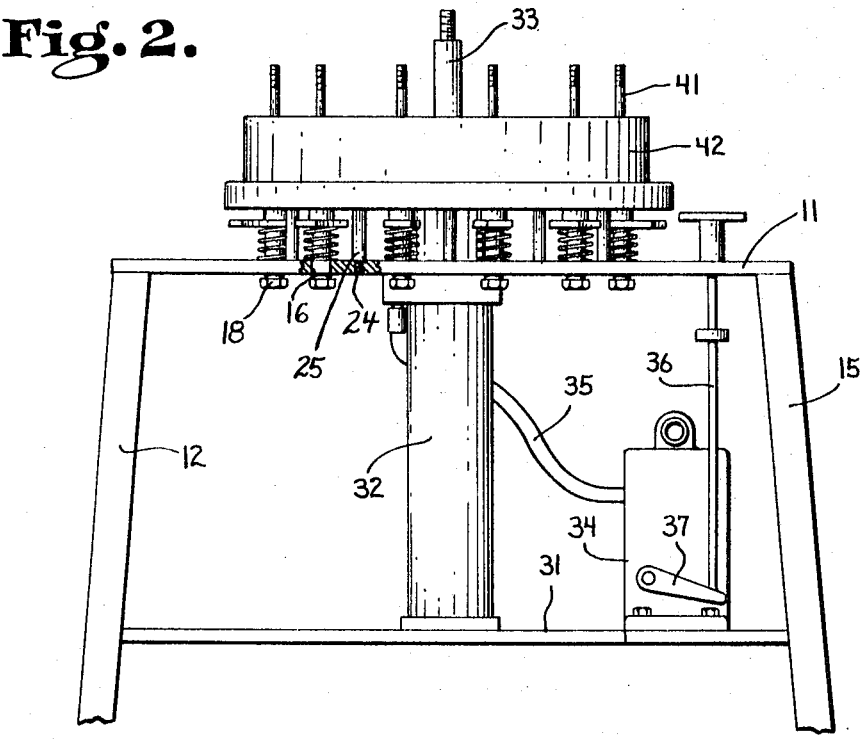
FIGURE 2 is a side view of a wheel and tire assembling machine showing a wheel half mounted thereon and partially broken away to show parts in section.
Figures 4A, 4B:
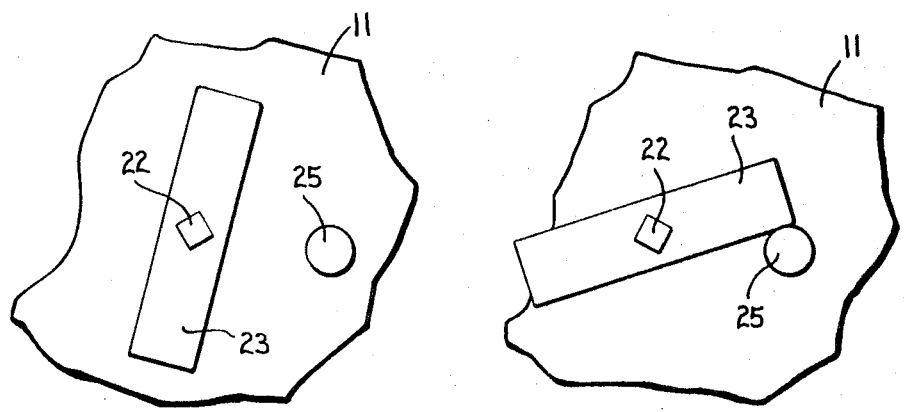
FIGURE 4(a) is a partial top view showing a socket holder in a first position.
FIGURE 4(b) is a partial top view showing a socket holder engaging stops.
Figure 3:
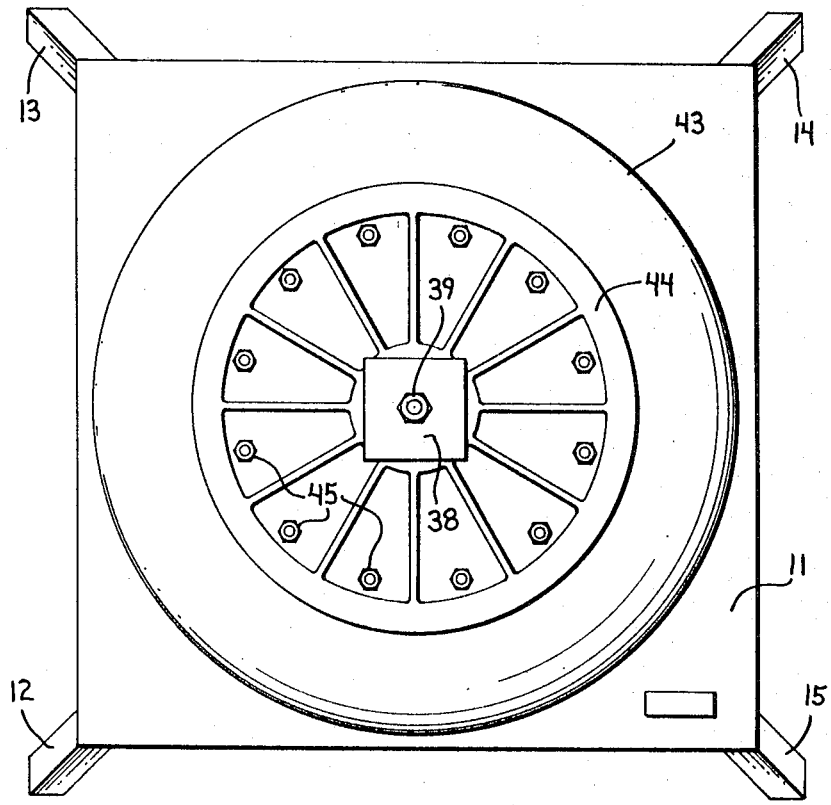
FIGURE 3 is a top view showing a wheel and tire mounted on the assembling machine.

Referring particularly to FIGURES 1 and 2 of the drawings, there is shown a horizontal support plate 31 that is attached to legs 13 and 15. A cylinder 32, which might either be of the air or liquid type, is attached to support plate 31. A piston rod 33, which is an operable part of cylinder 32, extends upwardly through a hole in base plate 11 and extends beyond the sockets 27. A hand pump 34 is also attached to support plate 31 and a fluid line 35 connects pump 34 to cylinder 32. Hand pump 34 is selected to be compatible with cylinder 32, that is, if cylinder 32 is an air cylinder, then pump 34 would be an air pump, and likewise, if cylinder 32 operates on fluid, then pump 34 would be hydraulic. A rod 36 is connected to a handle 37 on pump 34, which operates a valve to release the pressure on cylinder 32 when desired. A pressure plate 38 is attachable to piston rod 33 by means of a nut 39.

In operation, the proper size sockets 27 and guide plate 28 are selected, depending upon the particular wheel that is to be assembled. Many military aircraft wheels have twelve lug bolts 41 and, accordingly, twelve sockets 27 are provided and engage with twelve socket holders 17 on base plate 11. The sockets 27 are maintained in vertical alignment by guide plate 28 and, as socket holders 17 are resiliently mounted on springs 26, sockets 27 have limited vertical movement. The heads of lug bolts 41 are inserted into sockets 27 and then the inner half 42 of an aircraft wheel is placed on the machine with the lug bolts 41 passing through holes in the inner wheel half 42, as shown in FIGURE 2 of the drawing. The tire 43 and outer wheel half 44 are then placed in position upon the inner wheel half 42 with the lug bolts 41 passing into holes in the outer wheel half 44. Pressure plate 38 is then attached to piston rod 33 by threading nut 39 onto the threaded end of piston rod 33. Actuation of hand pump 34 retracts piston rod 33 which, in turn, causes pressure plate 38 to drawn the outer wheel half 44 into contact with the inner wheel half 42. When the two wheel halves have been drawn into position, the threaded ends of lug bolts 41 are accessible and the wheel nuts 45 are threaded thereon and secured tightly. In order to facilitate the insertion of the heads of lug bolts 41 into sockets 27, sockets 27 can be rotated a short distance. However, upon tightening of the wheel nuts 45, the stop arms 23 of socket holders 17 rotate against stops 25 which prevent any further rotation of sockets 27. After the wheel nuts are made tight, the valve in hand pump 34 can be opened which releases cylinder 32, and pressure plate 38 can then be removed which allows the assembled wheel and tire to be removed from the machine.

The assembling machine of the present invention can also be utilized to disassemble an aircraft wheel. The feature of having the sockets rotatable is essential when the machine is used for disassembly for the heads of the lug bolts are drawn securely against the wheel and cannot rotate relative to the wheel. Thus in order for the bolt head, which might be hexagons, to engage the sockets, it is necessary to rotate the sockets until there is proper alignment for engagement. The engagement of stop arms 23 with stops 25 limits, however, the amount of rotation of sockets 27.

It can thus be seen that the present invention provides a relatively simple and inexpensive machine for facilitating the assembly and disassembly of an aircraft wheel and tire. The assembly or disassembly can be completed quickly and safely by one man. Obviously many modifications and variations of the present invention are possible in the light of the above teachings. It is therefore to be understood, that within the scope of the appended claims, the invention may be practiced otherwise than as specifically described.

What is claimed is:
1. A machine for assembling a tire between first and second wheel halves comprising:
   a base plate,
   a plurality of socket holders rotatably mounted to said base plate in a circular array,
   a plurality of sockets removably attached one each to each said socket holder, said sockets being adaptable to engage one each of a plurality of wheel lug bolts,
   means for limiting rotation of said sockets,
   a guide plate for aligning said sockets parallel to one another, and
   means attached to said base for moving said first and second wheel halves together with said tire therebetween whereby said lug bolts can be threadedly engaged with wheel nuts.
2. A machine for assembling a tire between first and second wheel halves as set forth in claim 1 wherein said means for limiting rotation of said sockets includes a stop arm extending outwardly in two directions from each said socket holder and a plurality of stops attached to and extending upwardly from said base plate between adjacent socket holders whereby each said stop arm is engageable with adjacent stops.
3. A machine for assembling a tire between first and second wheel halves as set forth in claim 1 wherein said means for moving said first and second wheel halves together includes a cylinder attached to said base plate, a piston reciprocable within said cylinder, a pressure plate removable attached to the outer end of said piston and engageable with said first wheel half, and means for actuating said piston in said cylinder whereupon actuation of said piston moves said first wheel half toward said second wheel half.

References Cited
UNITED STATES PATENTS 2,228,086  1/1941  Rodgers _____ 157—1
2,945,522  7/1960  Nelson _____ 144—288

TRAVIS S. McGEHEE, Primary Examiner

U.S. Cl. X.R.

144—288